Patented Dec. 12, 1933

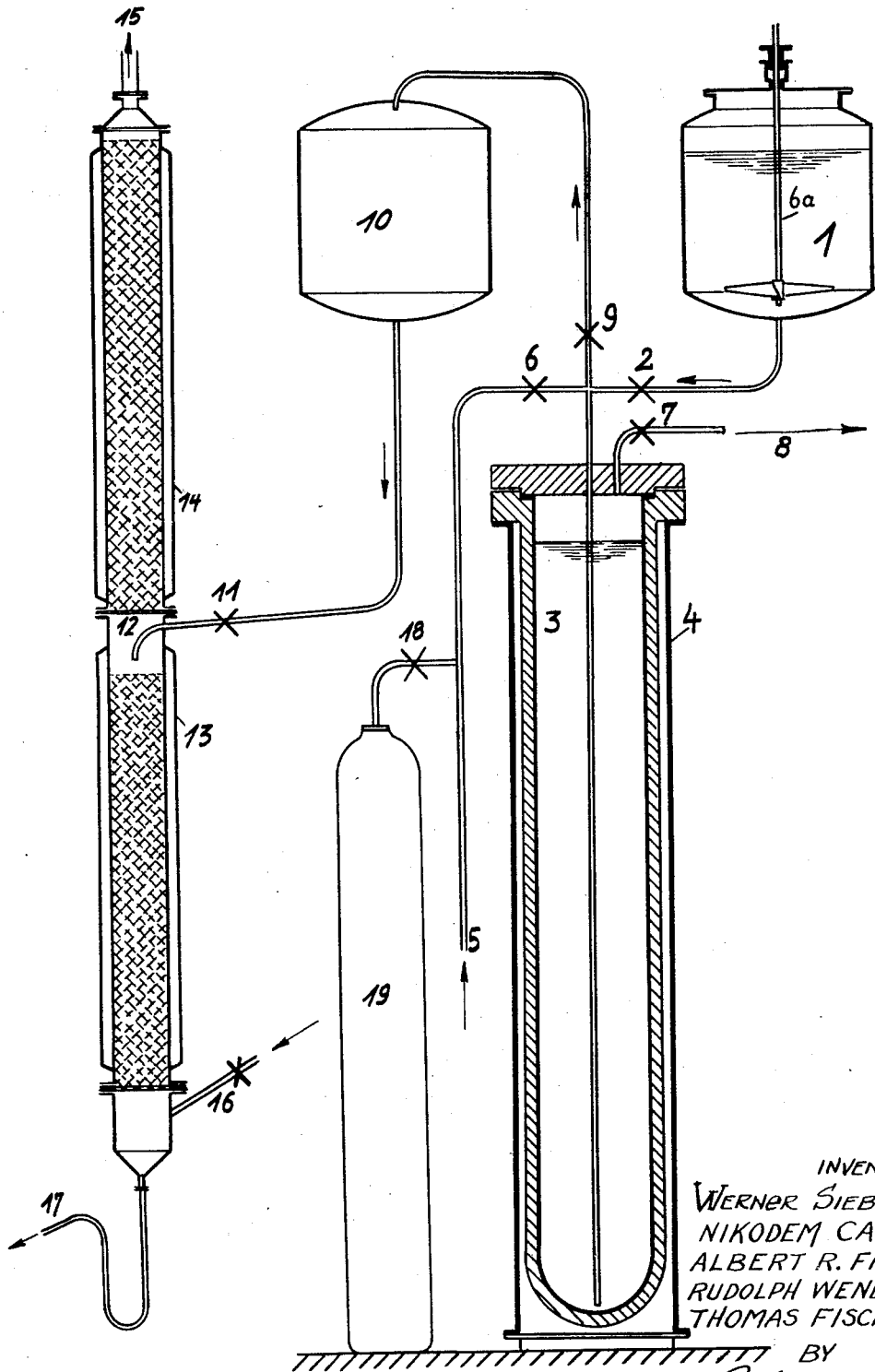

1,939,162

UNITED STATES PATENT OFFICE 1,939,162

PROCESS OF PRODUCING CONCENTRATED NITRIC ACID

Nikodem Caro, Berlin-Dahlem, Albert Rudolph Frank, Berlin-Halensee, and Werner Siebert, Rudolph Wendlandt, and Thomas Fischer, Piesteritz, Germany Application January 11, 1930, Serial No. 420,304, and in Germany December 6, 1928

10 Claims. (Cl. 23—160)

We have filed an application in Germany, Dec. 6, 1928, No. F. 67,357.

It is known, to produce highly concentrated nitric acid from nitrogen oxides, water and oxygen under pressure. In order to counteract the dissociation of the nitric acid, the lowest possible temperatures were always used. The highest temperatures which were believed to be allowable were at about 70° C., the corresponding pressures amounting to about 20 atms.

It has been discovered contrary to all expectations that by further temperature increase the output in nitric acid can be increased so considerably that the production of highly concentrated nitric acid under pressure becomes possible on technical scale. At the working at temperatures up to 70° the equilibrium of the reaction components relatively to the nitric acid formation is attained scarcely or only very slowly, whereas at temperatures above 70° the equilibrium is slightly shifted towards the nitric acid-dissociation, but due to the very much more rapid obtention of this equilibrium in spite of the tendency of the nitric acid to dissociate a considerable increase in output is obtained.

As example may be mentioned, that the working up of liquid nitrogen tetroxide at the pressure of 50 atms. with oxygen and water to nitric acid is completed under similar conditions about 8 to 10 times more rapidly, or 8 to 10 times smaller pressure apparatus are required if the temperature is increased from 70° to 100° C.

The favorable temperature range is at temperatures of 70° to 120° C. At 120° the reaction period is already so short that a further increase of temperature is hardly advantageous any more, due to the inconveniences resulting from the increase of the tetroxide concentration in equilibrium. At temperatures below 70° the remaining tetroxide-concentration would be less great, but it is impossible to adjust the equilibrium rapidly enough.

By the pressure the equilibrium as well as the reaction speed are favorably influenced. The higher the pressure, the higher will be the HNO$_3$-concentration at a certain percentage of total-nitrogen in the liquid. The remaining tetroxide-concentration goes back with increasing pressure. Under the conditions existing at present it is advisable to work at pressures from 50 to 200 atms. The upper limit is given however only by the apparatus requirement and the costs of the plant, not by the physical-chemical conditions. Statements as regards pressure are valid only for the working with oxygen or with mixtures, which contain, besides nitrogen oxide, oxygen in preponderance. If instead of the same oxygenated gas or gas-mixtures which contain a considerable percentage of neutral gases, i. e. also atmospheric air are used, the advantage of high and highest pressure is of much higher importance. Equilibrium and reaction speed become then more favorable with the increase in the partial pressure of oxygen; the higher is the amount of total pressure the smaller will be the amount of the oxygenated nitrogen in the waste gases and the easier it will be to work up these waste gases.

At the application of this process it is advisable, to carry out the heating of the raw substances under full pressure, since then the reaction has already started. It is also favorable, to let the finished acid cool under full pressure. One obtains thus, specially at slow cooling, the most rapid reduction of the remaining tetroxide-concentration, as the equilibrium shifts continually in favor of the nitric acid and the reaction speed is always kept as high as possible. The process, therefore, is carried out in such a manner, that first the reaction mixture is heated to a high temperature, for instance 100°, the main quantity of the tetroxide being converted at this occasion, whereupon the temperature is allowed to sink. Several stages might also be used. In this manner the highest concentration in nitric acid is attained in the shortest time. The process permits to produce any concentration in NO$_3$, even such as 98 to 100%. It is obvious that also less concentrated nitric acids can be produced according to this process as for instance acid of 90 to 95% or of 60 to 70%.

It is found while carrying out the process that ordinary pressure tubes can be used, into which oxygen or a gas mixture containing oxygen and nitrogen is introduced from below in a cold or warm state. It is surprising that, without moved parts, it is thus possible to completely utilize the gas within the pressure and temperature range described and to avoid formation of layers in the liquid. If for instance a mixture containing nitroxide and oxygen and produced by another method is available, the same can be compressed to for instance 50 atms. and sent into the pressure tubes; then the liquid which might have been seperated at the stepwise compression penetrates into the pressure tubes, eventually mixed with water or aqueous nitric acid. Or the nitrogen oxides, for instances in the form of liquid nitrogen tetroxide are withdrawn from such gas mixture, eventually after drying. This can be done, in known manner, by cooling to low temperature, at atmospheric pressure, eventually also with liquid or solid absorption means or at increased pressure i. e. 5 or 10 atms. Liquid nitrogen-tetroxide is admitted with water or aqueous nitric acid into pressure tubes and it is only necessary to introduce oxygen, the compressing of which to 50 or 200 atms. is very simple and not very expensive in the comparatively little quantity. Pressure pipes with heating jackets (water jacket, steam jacket, oil bath, electric heating) are preferably used for heating the same to the required temperature or for equalizing losses of heat; a cooling jacket might also be provided, or spraying with cooling water might be used at the cooling of the pipes. A water jacket may for instance be provided adapted for heating up with steam-supply or with cold water supply. The compressed gas flows preferably at the bottom end into the liquid, i. e. through a dip pipe in case the admission pipe passes through the upper cover. The reaction itself does not consume any heat, and the process may be so conducted, that a separate source of heat or heating jackets are unnecessary. In this case it is specially advantageous to use a stapling room for the inflowing compressed gas and to eventually also sluice in the raw mixture. For that purpose the liquid is poured into pressure cylinders and is led from these cylinders into a reaction chamber or reaction vessels. By those means it is possible to fill with a new charge a reaction pipe which is still warm and has not been aired. This way of carrying out the process is also advantageous if work is done continuously. At larger units a sufficient temperature increase is obtained in this manner by the reaction heat alone. Insulating of the pipes might also be useful. Several pipes might be united to different pressure- and temperature-stages by gas and liquid conduits; by providing the end stage for instance with specially high pressure it is possible to work periodically or continually or semicontinually in the counter current or in the equal current. By sluicing in the liquid raw substances repeated cooling is avoided or reduced, and the rooms are better utilized. A stapling room for the inflowing compressed gas requires a better utilization of the pressure spaces and of the compressors. At the same time the use of large gas quantities at the beginning is thereby made possible, which are taken from the stapling room and are adapted to produce an instantaneous temperature increase. Aqueous nitric acid and tetroxide are preferably produced in a mixture which is suitable for the purpose of working up to a highly concentrated nitric acid. In another case tetroxide and aqueous nitric acid may be mixed together either before or while they are poured into the high pressure pipe. In some cases it is advantageous to undertake this mixing a long time before the substances are poured into the high pressure pipe, to enable nitrogen tetroxide and water to partly form nitric acid. Water or aqueous nitric acid may be mixed with nitrogen tetroxide in stirring vessels, and the gases leaving those vessels may be led back into the device for the purpose of producing tetroxide. Oxygen may also be added during the process of mixing. In other cases, when aqueous nitric acid has not been primarily employed, it is possible to add concentrated nitric acid either in a pure form or containing tetroxide.

As at increased temperature in the equilibrium a little tetroxide always remains in the highly concentrated acid, highly concentrated acid free from tetroxide can be obtained in the pressure pipes only with difficulty or inconveniences. It is generally more advisable to bleach or rectify at atmospheric pressure or even at reduced pressure the acid produced under pressure. Acid produced in the pressure space may for instance be discharged with utilization of its heat content into a vessel preferably fitted with re-cooler, from which it flows out bleached through a gas expelling apparatus, for instance a serpentine coil or a pipe with filling bodies. The degassing may be favored by a lower heating jacket or by oxygen or air or vapors from concentrated nitric acid, whereas the outflowing gases after passing through a re-cooler may eventually return into the working up of nitrogen oxide. The final gas from the working of nitrogen oxide might be allowed to flow into the column and, enriched with nitrogen oxides, returned into the working. For the bleaching any other method might be applied. To less highly concentrated acid the bleaching is omitted, as the process supplies itself acid free from tetroxide already in the pressure pipe.

For technically carrying through the process conduits, fittings and pressure chambers or their linings are preferably made of chromium steels or similar alloys. Ferro silicon or ceramic material is less suitable. Chromium steels are, however, not to speak of the expense, most difficult to treat, for repair.

Hitherto the aluminum, which in the nitric acid industry is preferably used for refrigerations at the condensation of the nitrogen oxide and for similar purposes, has not been used, as it was supposed that this metal, at increased temperatures and pressures, could not withstand the action of the nitric acid of high percentage. By experiments it has, however, been ascertained that these apprehensions are not founded, as the aluminium in any form, be it pure or in alloys with other metals such as silicon, or coated with special protecting layers or an oxide coating, is very useful as building material for the apparatus or for lining, even for those parts of a nitric acid high concentration plant, which are most strained by heat and pressure. If the aluminium is used as pure metal, it lasts better the higher its precentage is. The possibility, to use aluminium and its alloys, facilitates the production of nitric acid of high percentage from nitroxide or liquid nitrogen-tetroxide, water or aqueous nitric acid and oxygen or oxygenated gas mixtures under pressure.

As far as it is compatible with the compressive stress pressed vessels or conduits entirely of aluminium or aluminium alloys can be used. Further aluminium linings may be used, which at high pressures fit automatically tightly against the walls and intercept the pressure, this being a serious advantage of these linings compared with all other suitable materials. Independent aluminium vessels may also be placed in a pressure chamber, or intervals may be left which are filled with neutral gases or the oxygen which is used, so that the insert is equally loaded on both sides or submitted only to a pressure difference which can not do any harm. The inserted vessels can be easily removed.

The outer pressure jacket may be fitted with an aluminium lining. A lining of ceramic material such as quartz or the like might be inserted in the aluminium envelope to preserve the same. The process might, however, be conducted so that no protecting of the aluminium envelope is necessary. It is important that the pipes be correctly treated. They are protected against mechanical-thermic alterations and corrosion when temperature-changes take place under pressure. The heating of the aqueous raw substances ought to be carried out under full service pressure. It is further of advantage for the apparatus to keep the water concentration low in starting from aqueous tetroxide containing acid and not from water and tetroxide, although the apparatus is evidently adapted to be used for such mixtures.

It is specially advantageous to add from the beginning a little aluminium to the liquid to be worked up, since then the aluminium wall cannot be corroded at all. It might therefore be advisable to obtain the raw mixture in aluminium apparatus or to prepare the same over aluminium rings, or to fill the pressure pipes with aluminium rings. With the aqueous raw mixture aluminous mud might be simply brought into touch, which mud separates from the production if the raw mixture contains some aluminium.

Aluminium-lined pressure pipes without moved parts, closed at the top and bottom ends by a lid or bottom plate lined with aluminium, have stood the test perfectly in service. The pipes might be fitted with an outer heating jacket. Connections for the acid- and gas-valves extend preferably through the covers, or through the cover when the pipe is closed at one end and has only one cover. Pipes, closed at one end and lined with aluminium, with one cover may be used. The compressed gas can be admitted through this cover, and taken up by the surface of the liquid or introduced into or distributed in the liquid by dipping devices. The valves may be mounted preferably on T-pieces. The working is periodical or continuous. The pipes may contain filling material or catalysers, or they might be used empty. Several such pipes may be connected the one with the other by conduits lined with aluminium, for instance in order to obtain pressure- and temperature-stages, to work in countercurrent, to sluice in liquid, to staple compressed gases, to utilize waste gas and so on.

When using aluminium as working material the production of nitric acid of high percentage can be carried through in quite simple apparatus, and we claim this use of the aluminium independently of the simultaneous use of other metals or materials, and independently of details of the production process. The process claimed and described can be carried out in devices constructed of a number of different materials. Chromium steels or aluminium or both at the same time, or different alloys might be used. For the lining pure aluminium is for instance very well suited. The fittings are preferably made of chromium steels.

A preferred embodiment of the inventive idea is illustrated in the accompanying drawing by way of example only. In the drawing which shows diagrammatically and partly in cross-section an apparatus made in accordance with this invention, a vessel 1 is adapted to contain nitric tetroxide and aqueous nitric acid used in the process. These substances are thoroughly intermixed by means of a mixer $6a$ and are analysed for the purpose of determining whether they contain the right proportion of $N_2O_4$, $HNO_3$ and $H_2O$. By way of example it may be assumed that 71 parts by weight of $N_2O_4$ and 29 parts by weight of a 60% strong nitric acid are poured into the vessel 1 and are mixed with each other. This mixture is then introduced into a digester 3 by way of a valve 2. The valve 2 is then closed and a valve 6 opened, thereby allowing oxygen to be introduced under pressure through a tube 5 into the digester 3.

Oxygen is absorbed exceptionally quickly in the beginning so that it would have been necessary to provide a very large compressor to supply the absorbed amount of this gas in the beginning of the process. To eliminate this necessity a supplementary pressure vessel 19 is arranged, which contains compressed oxygen and is connected over a valve 18 with the tube 5 leading to the main compressor. By means of this arrangement oxygen contained in the vessel 19 may be introduced into the digester 3 together with oxygen supplied by the main compressor, not shown in the drawing, through the tube 5. During this first and quick reaction the mixture contained in the digester 3 is heated to a temperature varying from 50° C. to 100° C. by the reactive heat produced by oxidizing $N_2O_4$ to $HNO_3$. If necessary, the digester 3 is simultaneously additionally heated by steam passing through a valve 20 into a chamber formed by a jacket 4 surrounding the digester 3, so that the temperature of the mixture rises higher than 70°. An analysis of the gases which have been formed over the mixture after oxygen has been absorbed and which are led out of the digester 3 through a tube 8 and a valve 7 inserted in this tube, shows whether an absorption of oxygen still continues to take place. Owing to the fact that oxygen used in the process is not 100% pure, but contains small amounts of nitrogen, a gaseous substance is produced in the upper part of the digester in the beginning of the process, said gaseous substance containing in a concentrated form the inert gases originally mixed with oxygen. Small amounts of the gas are continuously blown through the valve 7, and the amount of oxygen contained therein is increased after about 2 or 3 hours to 90%. The oxygen pressure in the digester is simultaneously increased up to 50 at. for the purpose of bringing the reaction to an end. The main compressor which supplies oxygen through a tube 5 and which has a constant hourly output, is used at the end of the operation to fill again with compressed oxygen the supplementary pressure vessel 19 so that this vessel contains always an amount of this gas necessary for the next charge.

After the reaction is terminated the valve 6 is closed and the reactants are led through a valve 9 into a container 10. The nitric acid thus produced, which still contains a small amount of nitric tetroxide, is passed through a valve 11 into bleaching columns 13 and 14. The lower part of these vessels may be heated to a temperature of about 80° C. to 100° C. by external steam, so that nitric tetroxide contained in the acid is evaporated while passing through this part of the apparatus. At the lower end of the device an acid having more than 98% $HNO_3$ and less than .1% $N_2O_4$ is passed through a siphon 16 and led out of it To accelerate the degassing process some oxygen may be introduced into the parts 13 and 14 by means of a valve 16. Vapors of $HNO_3$, which escape from the hot mixture of nitric acid and tetroxide during the downward movement of this mixture, are condensed in the upper portion of the vessel 14 surrounded by a cooling water-jacket, so that pure $N_2O_4$ leaves the upper end of the vessel 14 through a tube 15.

We claim:—

1. A process of producing nitric acid from gas mixtures containing nitrogen oxides, or from liquid nitrogen tetroxide, water or aqueous nitric acid and oxygen or oxygen-containing gases comprising the step of applying pressure from 50 to 200 atmospheres at a temperature ranging between 70° C. and 120° C.

2. A process in accordance with claim 1 wherein the heating of the primary substance to temperatures ranging between 70° C. and 120° C. is carried out at full pressure.

3. A process in accordance with claim 1 comprising the step of cooling at full pressure the resulting highly concentrated nitric acid.

4. A process of producing nitric acid from gas mixtures containing nitrogen oxides, or from liquid nitrogen tetroxide, water or aqueous nitric acid and oxygen or oxygen-containing gases comprising the steps of converting a large portion of the primary substance at a temperature of about 100° C. and completing the reaction at a sinking temperature ranging between 100° and 70° C., the pressure remaining between 50 and 200 atmospheres during the process.

5. A process in accordance with claim 1 comprising the preliminary step of reacting tetroxide with water at an atmospheric pressure.

6. A process in accordance with claim 1 comprising the preliminary step of reacting tetroxide with aqueous nitric acid at an atmospheric pressure.

7. A process in accordance with claim 1 comprising the step of introducing a liquid primary substance under pressure into the reaction chamber.

8. A process in accordance with claim 1 comprising the preliminary steps of stapling compressed oxygen and introducing said oxygen from a stapling chamber into the reaction chamber.

9. A process in accordance with claim 1 wherein the gases enter at the bottom of the liquid.

10. A process in accordance with claim 1 wherein the finished raw acid is bleached at atmospheric pressure.

NIKODEM CARO.
ALBERT RUDOLPH FRANK.
WERNER SIEBERT.
RUDOLPH WENDLANDT.
THOMAS FISCHER.